May 12, 1959

H. SCHLÜTER 2,885,995

CIGAR TREATING APPARATUS

Filed Feb. 23, 1956

INVENTOR
Heinrich Schlüter

May 12, 1959 H. SCHLÜTER 2,885,995
CIGAR TREATING APPARATUS
Filed Feb. 23, 1956 6 Sheets-Sheet 5

Fig. 16

INVENTOR

May 12, 1959     H. SCHLÜTER     2,885,995
CIGAR TREATING APPARATUS Filed Feb. 23, 1956     6 Sheets-Sheet 6

INVENTOR
Heinrich Schlüter

United States Patent Office 2,885,995
Patented May 12, 1959

2,885,995
CIGAR TREATING APPARATUS

Heinrich Schlüter, Vlotho (Weser), Germany, assignor to Firma Heinrich Schlüter, Vlotho (Weser), Germany Application February 23, 1956, Serial No. 567,432

Claims priority, application Germany February 22, 1955

33 Claims. (Cl. 118—5)

The present invention relates to cigar treating apparatus.

More particularly, the present invention relates to apparatus for finishing cigars. Thus, cigars are provided at their outer surfaces with a powder applied to the cigars through the medium of a solution which carries the powder in order to improve the appearance and burning qualities of the cigars, and in order to prevent smearing of the coating which is applied in this manner a fixing solution is applied to the cigars. Thereafter the cigars are cut to the desired lengths.

One of the objects of the present invention is to provide a single apparatus capable of applying both the powder solution and the fixing solution to the cigars, so that the same machine need not be used twice to perform these two operations and so that two separate machines need not be provided for performing these two operations.

Another object of the present invention is to provide a cigar treating apparatus which is capable of being easily adjusted so as to accommodate cigars of any length and thickness without undesirably squeezing the cigars and also capable of cutting the cigars to any desired lengths.

A further object of the present invention is to provide an apparatus of the above type which is capable of drying the cigars after the solutions are applied thereto without at any time increasing the temperatures of the cigars to above 50° C.

An additional object of the present invention is to provide an apparatus of the above type with a means which prevents powder and the like carried in solution from becoming deposited undesirably in the bottom of the containers or from undesirably clogging conduits along which the solution is conveyed.

Still another object of the present invention is to provide an apparatus capable of applying to the cigars a powder coating, a fixing coating, and capable of drying the cigars as well as cutting the same, all while the cigars are in continuous movement so that there is a constant delivery of finished cigars from the apparatus.

Also, the objects of the present invention include an apparatus capable of accomplishing the above objects and at the same time composed of simple and ruggedly constructed elements which operate very reliably, which require a minimum of cleaning and other maintenance, and which produce a high output of cigars of the highest quality.

With the above objects in view, the present invention mainly consists of a cigar treating apparatus which includes a coating means for coating the cigars with a given solution. The apparatus also includes a fixing means for fixing the solution on the cigars so that the solution will not smear. Also the apparatus includes a drying means for drying the cigars, a cooling means for cooling the cigars, and a cutting means for cutting the cigars. The apparatus also includes a conveyor means for conveying the cigars first to the coating means, then to the drying means, then to the fixing means, then again to the drying means, and then to the cooling means and thereafter to the cutting means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
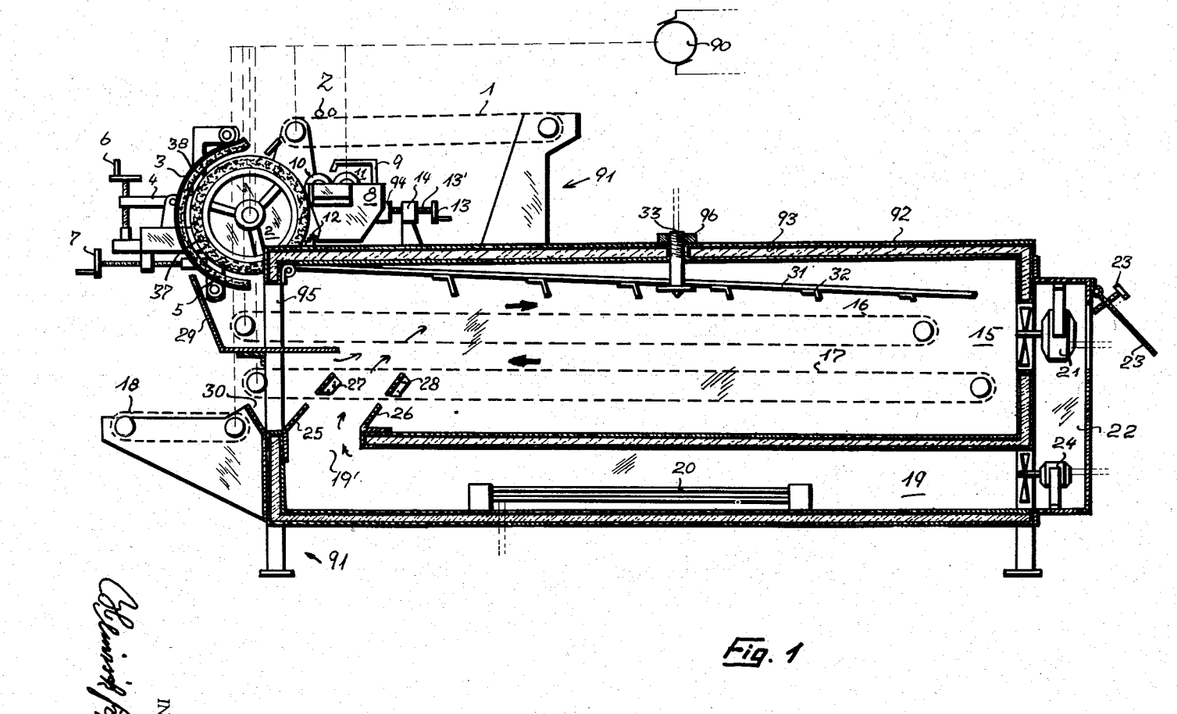
Fig. 1 is a sectional partly diagrammatic side elevational view of an apparatus according to the present invention, the section of Fig. 1 being taken longitudinally through an intermediate portion of the apparatus between the sides thereof.

Referring now to the drawings and to Fig. 1 in particular, it will be seen that the structure of the invention includes a support means 91 in the form of a suitable frame which carries all of the structure of the invention. This support means carries a conveyor band 1 supported by suitable pulleys and driven so that the top run of the conveyor band moves to the left, as indicated in Fig. 1. Cigars Z to be treated are placed on the conveyor band 1 either by hand or they may drop onto the conveyor band after leaving a previous treating machine.

As the cigars Z reach the left end of the conveyor band 1, as viewed in Fig. 1, they fall onto a coating drum 2 which is in the form of a drum provided with an outer layer 37 of absorbent foam rubber. A bendable sheet 3 forms a holding member for holding these cigars against the coating drum 2, and this bendable sheet 3 is itself provided with a layer of foam rubber 38. The bendable sheet 3 is adjusted by means of the levers 4 and 5 in a manner described below, the levers 4 and 5 being actuated by the turnable screw means 6 and 7, respectively, in a manner described in more detail below, so that the gap between the foam rubber layers 37 and 38 not only is uniform but also is of a desired thickness in order to accommodate cigars of a particular thickness. It will be noted that the holding member 3 together with its foam rubber layer 38 passes part way around the coating drum 2 and terminates opposite the lowest part of the coating drum 2. The coating drum 2 as well as elements 3—7 are carried by a suitable part of the support means 91.

The cigars are treated on the coating drum 2 so as to have a powder coating applied thereto, and this powder is carried in a liquid solution which is applied to the drum 2 so as to be transferred therefrom to the cigars, the wet coating being dried so as to leave the powder coating on the cigars. The solution which is to be applied is located within a container 8 which carries a pair of distributing rollers 10 and 11 which form a distributing roller means for distributing the solution onto the drum 2. A suitable pump within the container 8 pumps the solution therein through the conduit 9 onto the distributor rollers 10 and 11, and the latter then apply the solution to the drum 2. The container 8 is held at its left edge, as viewed in Fig. 1, against an angle iron 12 which is fixed to the top face of the upper wall 92 of a drying chamber 15 which is carried by the support means 91. The wall of the drying chamber 15 is hollow and is provided in its interior with a heat insulating material 93. It will be noted from Fig. 1 that the container 8 is spaced from the top face of the wall 92, and this space may be on the order of 5 mm. A block 94 is fixed to the right face of the container 8, as viewed in Fig. 1, and the end of a screw 13' engages the block 94 and is turnable in a threaded bore formed in a block 14 carried by the wall 92. A crank handle 13 is fixed to the screw 13', so that by turning the crank handle 13 the operator may tilt the container 8 about the angle iron 12, and in this way the distributor roller 10 may be located against the coating drum 2 with a greater or lesser contacting force.

The drying chamber 15 is provided at its left end, as viewed in Fig. 1, with an opening 95, and a conveyor band 16 carried by suitable pulleys which are in turn supported for turning movement by the support means 91 extends through the opening 95 beneath the bottom end of the holding member 3 to receive cigars which drop from the holding member 3, after the cigars have been coated by the above described coating means. The top run of the conveyor band 16 moves to the right, as viewed in Fig. 1, so that the cigars from the coating means are moved to the right along the interior of the drying chamber 15 until they reach the right end of the conveyor band 16, and from the latter the cigars drop onto the conveyor band 17 whose top run moves to the left, as viewed in Fig. 1, so that the cigars are in this way carried back to the opening 95 of the drying chamber 15. The conveyor band 17 may have the same construction as the conveyor band 16 and is supported in the same way for movement, although the conveyor band 17 moves in the opposite direction from the conveyor band 16. The left end of the conveyor band 17 which extends outwardly beyond the chamber 15 is located over a conveyor band 18 carried by suitable pulleys at a part of the support means 91 for receiving cigars from the conveyor band 17 and for transporting the cigars to any desired further structure for further treating the same.

Beneath the dying chamber 15 there is located a heating chamber 19 in which heating elements 20 are located, and the heating chamber 19 communicates at its left end, as viewed in Fig. 1, through an opening 19' with the interior of the heating chamber 15. The right end wall of the heating chamber 15 is formed with an opening in which a fan 21 is located for drawing air within the drying chamber 15 to the right through the opening in the right end wall of the chamber 15, and this fan 21 is located within a conduit 22 in the manner indicated in Fig. 1. The right wall of the conduit 22 is formed with an opening capable of being covered by the valve member 23 which is hinged at its top edge to the outer face of the conduit 22, and this valve member 23 threadedly carries a screw member 23' whose free end engages the outer face of the conduit 22, so that by turning the screw member 23' the angular position of the valve member 23 may be adjusted and in this way the amount of air withdrawn from the chamber 15 by the fan 21 and discharged to the atmosphere by the opening in the right wall of the conduit 22 may be regulated.

The chamber 19 is formed at its right end, as viewed in Fig. 1, with an opening in which a fan 24 is located, and this fan 24 blows air from the conduit 22 into the chamber 19. It will be noted that both the fans 21 and 24 communicate with the conduit 22, so that part of the air which is withdrawn from the drying chamber 15 by the fan 21 moves to the outer atmosphere when the valve 23 is opened and the remainder of the air is moved by the fan 24 into the chamber 19 to be heated therein by the heating element 20 and to then move through the opening 19' into the interior of the drying chamber 15.

As is shown in Fig. 1, baffles 25—28 are provided for guiding the hot air from the heating chamber 19 upwardly and to the right along the interior of the drying chamber 15, as is viewed in Fig. 1. The baffles 25 and 26 are supported in the manner shown in Fig. 1 beneath the conveyor band 17, while the baffles 27 and 28 are supported between the top and bottom runs of the conveyor band 17, in the manner shown in Fig. 1. These baffles 27 and 28 have bent ends which are fixed to the inner side faces of the side walls of the chamber 15, in the manner indicated in Fig. 1. The bands 16 and 17 are air permeable so that the drying air moves upwardly through the bands 16 and 17. At the left end of the chamber 15 are located additional baffles 29 and 30 which are arranged as shown in Fig. 1 so as to compel fresh air which enters into the chamber 15 through the opening 95 to enter between the bands 16 and 17. The fan 21 has a greater output than the fan 24 and withdraws from the chamber 15 more air than can be delivered to the chamber 15 by the fan 24, so that the fan 21 creates a suction in the chamber 15 which draws fresh air into the chamber 15 through the opening 95, this fresh air mixing with the hot air entering chamber 15 through the opening 19'.

A plate 31 is located in the chamber 15 over the band 16 and is as wide as the latter, so that the band 16 is located in its entirety beneath the plate 31. Baffles 32 are fixed to the underside of the plate 31 and are directed downwardly and to the right, as viewed in Fig. 1, so that the hot air which rises upwardly to the top of the chamber 15 engages the plate 31 and the baffles 32 to be directed back down toward the conveyor 16, and the baffles 32 furthermore provide a turbulence in this air so that a very efficient drying action takes place.

A thermostat 33 is provided to control the heating elements 20 and/or the fans 21 and 24. This thermostat 33 is externally threaded to threadedly receive a nut 96, and it will be noted that the thermostat 33 extends through an opening of the plate 31 and engages the underside of the latter. The left end of the plate 31 is pivotally connected to the left inner face of the chamber 15 adjacent the top thereof, as is indicated in Fig. 1, so that as the nut 96 is turned the thermostat 33 will be raised and lowered and in this way the plate 31 will be raised and lowered so that the distance of the plate 31 and baffles 32 from the conveyor band 16 may be adjusted. The opening of plate 31 through which the thermostat 33 extends is large enough to permit the plate 31 to rise up to the top wall of the chamber 15. Thus, by manipulation of the nut 96 it is possible to adjust the position of the baffles 32.

Figure 18:
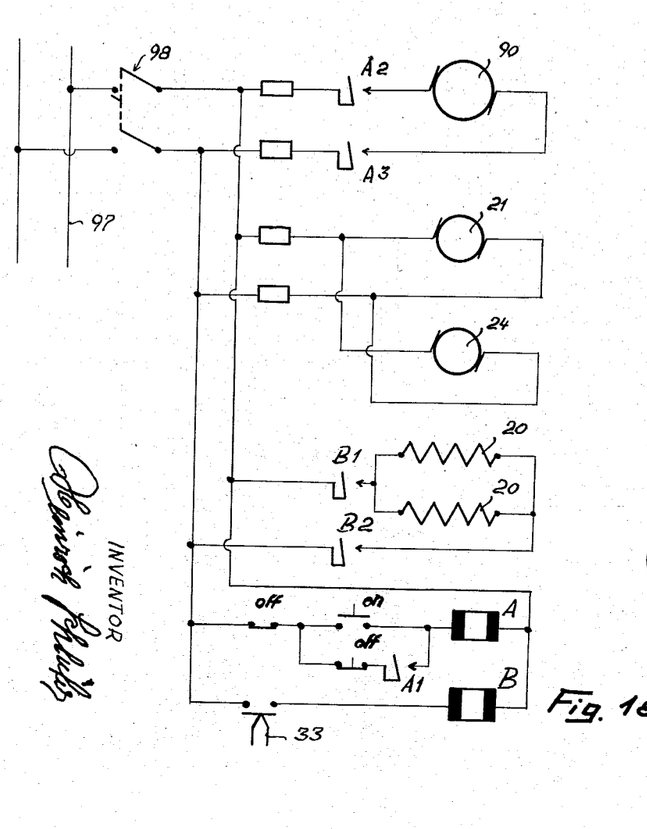
Fig. 18 is a wiring diagram showing the electrical circuits for the cigar treating apparatus of the present invention.

The wiring diagram for operating the structure of Fig. 1 automatically from the thermostat is indicated in Fig. 18. Referring to Fig. 18 it will be seen that from the lines 97 an electrical connection is made to a main switch 98 which may be opened to stop the operation of the entire machine and which may be closed to start the operation of the fans 21 and 24, as indicated in Fig. 18, these fans operating at all times, although it is possible, if desired, to operate the fans from the thermostat 33. The main motor 90 for driving almost all of the parts which require to be driven is connected between a pair of normally open relay switches A2 and A3. The heating elements 20 are connected in parallel between a pair of normally open relay switches B1 and B2. The relays A and B are shown in Fig. 18 connected electrically with the on and off switches shown in Fig. 18 and with the thermostat 33. It is apparent that as the temperature drops the thermostat will move towards its switch closing position, and when the thermostat 33 is located in its switch closing position the relay B will be energized to close the switches B1 and B2 and thus energize the heating elements 20. When the on switch is manually depressed, after closing of the main switch 98, the relay A is energized and closes the normally closed switches A1, A2 and A3 shown in Fig. 18, so that in this way the motor 90 is started and is maintained in operation even after the on switch is released and moves back to its open position. When it is desired to stop the machine either of the off switches indicated in Fig. 18 is operated, and it will be noted that the fans 21 and 24 will continue to operate until the switch 98 is opened. Instead of a single fan 21 and a single fan 24 it is possible to provide a plurality of these fans, such as, for example, three fans 21 and three fans 24.

The thermostat 33 is arranged to operate the heating elements 20 in conjunction with the fans 21 and 24 in such a way as to maintain within the drying chamber 15 a temperature which is always less than 50° C., so that the cigars are never heated sufficiently to cause their quality to deteriorate. This is in sharp contrast to the known arrangements where the temperatures in the drying chamber is not uncommonly at 130° C. The temperature is maintained at this undesirably high value in known arrangements in order to make the air in the drying chamber capable of holding more liquid. However, with the arrangement described above it is possible to thoroughly dry the cigars to the desired extent while maintaining a temperature of below 50° C. because of the movement which is imparted to the air by the above described baffles as well as because of the fact that part of the air withdrawn from the chamber 15 is always discharged through valve 23 to the outer atmosphere and because of the fact that fresh air is continuously drawn in through the opening 95.

Figure 17:
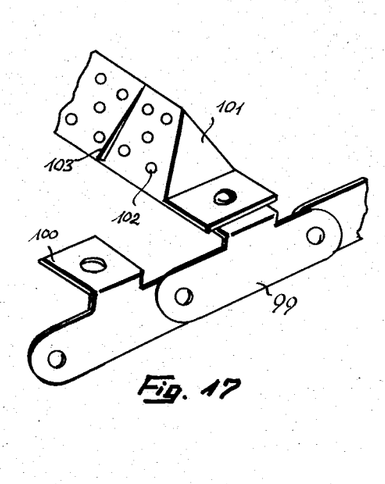
Fig. 17 is a fragmentary perspective view of part of a conveyor band used with the structure of the invention.

The construction of the conveyor bands 16 and 17 is indicated in Fig. 17. Each conveyor band is composed at its opposite sides of a plurality of pivotally interconnecting links 99 having tabs 100 extending therefrom, and between each pair of opposite tabs 100 there is connected a cross strip 101 which is of V-shaped cross section and which has its crest direct upwardly in the top runs of the conveyor bands. The opposite faces of each cross strip 101 is provided with a plurality of perforations 102 as well as with a plurality of elongated projecting ribs 103. The cigars extend transversely across the band in a direction substantially parallel to the cross strips 101, and the apertures 102 enables the air to move freely through the band, the air also passing between the small spaces between the successive cross strips 101. These strips are located close enough to each other to prevent the cigars from falling downwardly between the strips, and furthermore the ribs 103 keep the cigars at such a position that they are not smeared at their outer faces by engagement with the conveyor bands. The pulleys which support the conveyor bands have polygonal end plates which engage the links 99 which assume a mating polygonal shape as they pass about the pulleys, and as the bands pass about the pulleys in a downward direction the cigar is carried thereby and moved to the next lower band. The conveyor band 18 is also constructed in this manner.

As is diagrammatically indicated in Fig. 1, the single driving motor 90 is operatively connected to a pump within the container 8, as will be described below, as well as to the coating drum 2, the left pulley of the band 16, the left pulley of the band 17, and the right pulley of the band 18, so that in this way the entire apparatus is operated from the single motor 90.

Figures 2, 4, 5, 6, 7, 8:
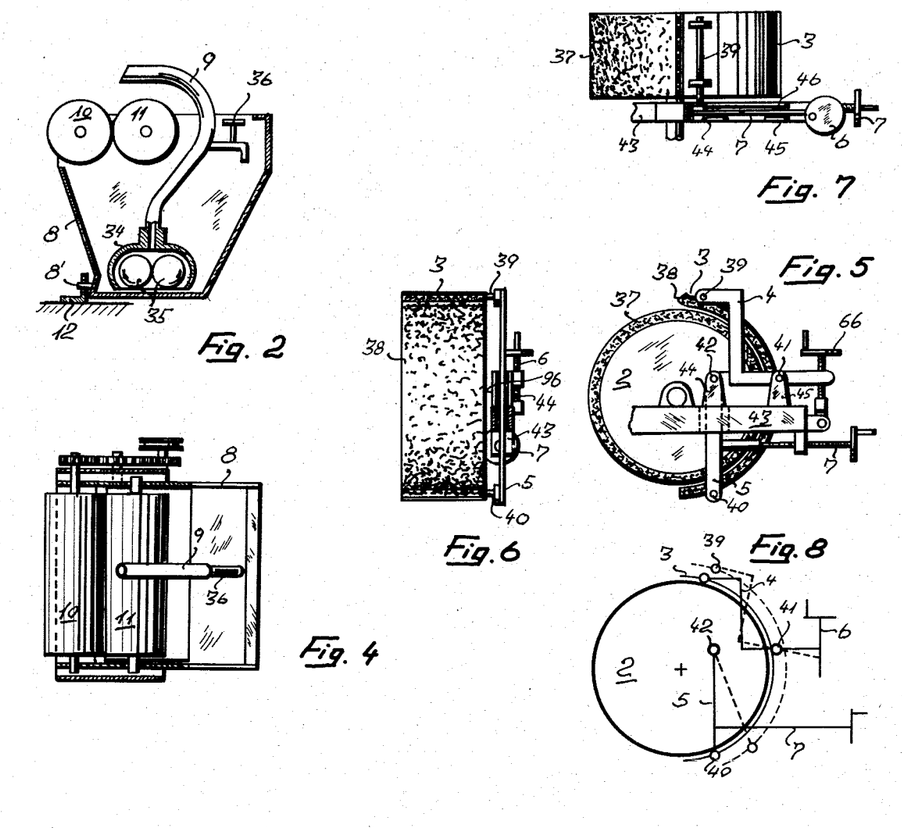
Fig. 2 is a sectional elevational view showing the interior of a container for holding a solution and showing a pump and distributor roller means associated with the container.
Fig. 4 is a top plan view of the structure of Fig. 3.
Fig. 5 is a fragmentary side elevational view showing a coating drum, a holding member for holding cigars next to the coating drum, and structure for adjusting the holding member.
Fig. 6 is an end view of the holding member of Fig. 5 and the adjusting structure connected thereto as seen from the left of Fig. 5.
Fig. 7 is a top plan view of the structure of Fig. 5.
Fig. 8 is a diagrammatic view of the structure of Fig. 5 to illustrate the operation thereof.
Figure 3:
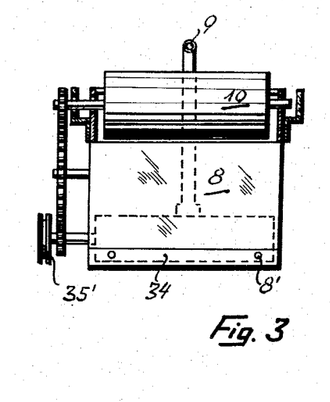
Fig. 3 is an end view of the structure of Fig. 2 as seen from the left thereof.

Referring to Figs. 2–4, it will be seen that the container 8 is provided at its left face, as viewed in Fig. 2, with a plurality of pins 8' which are fixed to the container 8 and which respectively extend freely through openings formed in the upwardly extending leg of the angle iron 12 which is fixed to the top wall 92 of the chamber 15, so that in this way the container 8 is connected to the angle iron 12 for turning movement with respect to the same. Within the container 8 is located a gear pump 34 having the pumping gears 35 indicated diagrammatically in Fig. 2, and this gear pump is driven by the pulley 35' shown in Fig. 3 which is in turn driven from the motor 90, in the manner indicated diagrammatically in Fig. 1. The pump 34 has a bottom inlet which is located very close to the bottom wall of the container 8, and furthermore the side walls of the container 8 which extend upwardly from the bottom wall thereof are located very close to the pump 34 in the manner indicated in Fig. 2. The pump 34 has a discharge conduit 9 which terminates over the distributor rollers 10 and 11, these distributor rollers being driven from the drive to the pump 34, as is shown by the gearing in Figs. 3 and 4. Furthermore, a manually operable valve 36 is carried by and communicates with the interior of the conduit 9, so that a part of the liquid which is pumped upwardly along the conduit 9 can be recirculated through the valve 36 back to the solution within the container 8. This recirculation of the liquid prevents stopping of the conduit 9, and the close spacing between the bottom inlet of the pump 34 and the bottom wall of the container 8 as well as between the side walls of the container 8 and the pump 34 maintains the liquid in the bottom of the container 8 moving at such a fast rate that there is no possibility of particles carried in the liquid becoming deposited undesirably on the bottom wall of the container 8. The pump 34 is supported in any suitable way within the container 8 as by having brackets fixed to ends of the pump 34 fixed also to a pair of opposite side walls of the container 8, respectively.

Figs. 5–7 illustrate the structure for adjusting the bendable holding member 3 and its foam rubber lining 38 with respect to the coating drum 2. As is shown in Figs. 5–7, the holding member 3 has fixed to its outer face adjacent one end thereof a pair of lugs through which a rod 39 turnably passes, this rod 39 being pivotally connected at one end to an end of the lever 4. In the same way the bendable holding member 3 is provided adjacent its opposite end with a pair of lugs which receive the rod 40 which is pivotally connected at one end to an end of the lever 5. The lever 4 is pivotally connected at 41 between a pair of lugs 45 and 46 fixed to and extending from a part 43 of the support means 91, this part 43 turnably supporting the coating drum 2 in the manner indicated in Fig. 5. The lever 5 is pivotally connected at 42 between the lug 46 and a lug 44, the member 43 being provided with a large enough opening to permit the desired amount of turning of the lever 5, as is indicated in dotted lines in Fig. 5. The element 6 for manually turning the lever 4 is in the form of a screw member passing through a threaded bore of lever 4 adjacent its right end, as viewed in Fig. 5, and having a manually engageable crank at one end, the opposite end of this screw member being turnably connected to a member which is pivotally connected to the frame part 43. Thus, as the adjusting element 6 is turned the lever 4 may be turned in one or the other direction about the axis of the pivot 41. In much the same way the adjusting element 7 for the lever 5 is in the form of an elongated screw member having a manually engageable crank at one end thereof and turnably connected at its opposite end to a part of the lever 5, this screw member extending through a threaded bore of an extension of the frame part 43. Thus, as the element 7 is manipulated the lever 5 may be turned in either direction about the pivot 42.

Fig. 8 illustrates the possible adjustments of the holding member 3. Thus, by manipulating the elements 6 and 7 it is possible to shift the points where the rods 39 and 40 engage the holding member 3 between the solid and dotted line positions indicated in Fig. 8, and thus it is easily possible to maintain the member 3 equidistant at all parts from the drum 2 while adjusting the distance between elements 2 and 3 so as to accommodate cigars of different thickness. This is possible because of the location of the turning axes 41 and 42 of the levers 4 and 5, respectively.

Furthermore, it should be noted that with this arrangement it is possible to locate the rod 40 nearer to the drum 2 than the rod 39, so as to provide, if desired, additional rolling of the cigars as they are coated.

One example of a coating solution which may be applied to the cigars by the coating drum 2 is as follows, the amounts being parts by weight:

| | |
|---|---|
| Magnesium oxide | 50.0 |
| Talcum | 50.0 |
| Calcium carbonate | 30.0 |
| Tobacco powder | 130.0 |
| Turmeric extract | 20.0 |
| Potassium nitrate | 20.0 |
| Alcohol | 150.0 |
| 5% aqueous solution of tylose (methylcellulose) | 550.0 |

Figure 9:
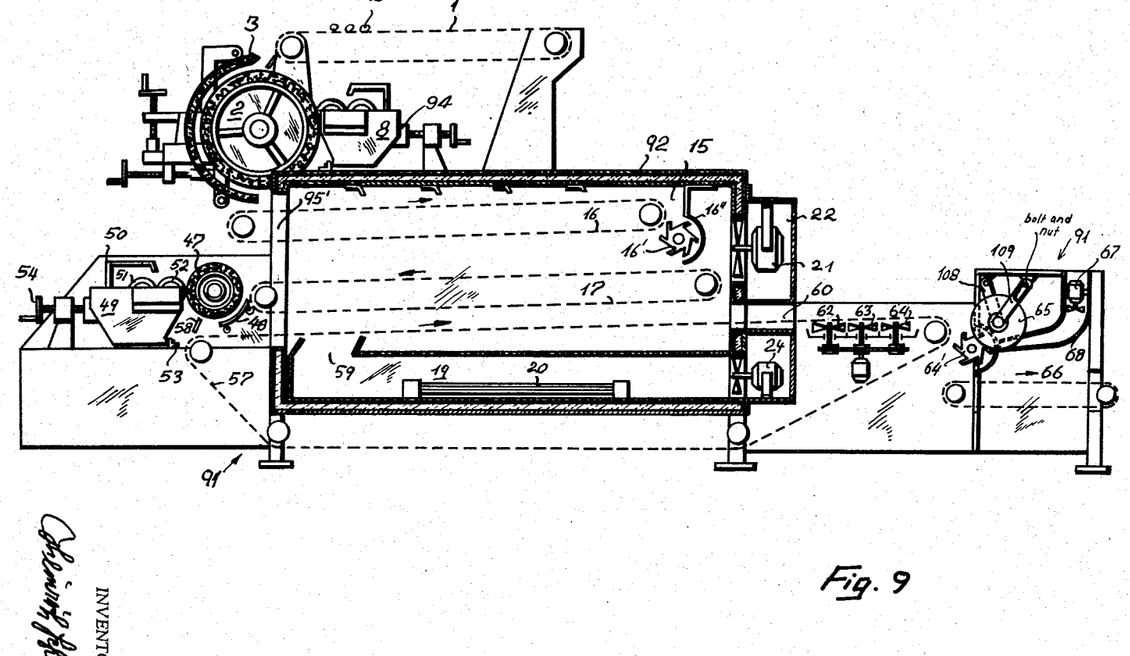
Fig. 9 is a partly sectional, partly diagrammatic, side elevational view of another embodiment of a cigar treating apparatus according to the present invention.

Fig. 9 shows an arrangement where an apparatus as described above for coating the cigars with a solution carrying the powder is combined with structure for fixing the coating on the cigars so that the coating cannot become smeared. Referring to Fig. 9 it will be seen that the structure carried by the top wall 92 of the drying chamber 15 is identical with that described above. The drying chamber 15 is substantially the same as that of Fig. 1, this drying chamber 15 of Fig. 9 being only a little deeper and having a somewhat larger opening 95' at its left end. It is to be understood that for simplicity's sake the elements such as the thermostat 33 and the adjustable plate 31 are omitted from Fig. 9, but these elements are nevertheless to be considered as included within this embodiment and to have the same construction as described above in connection with Fig. 1. The same is true of the baffles 25—29. Also, the embodiment of Fig. 9 may be provided in the same way with the valves 23 and with one or more fans 21 as well as one or more fans 24. In the embodiment of Fig. 9 a celled drum 16' of the cross section indicated in Fig. 9 is provided and is driven in a clockwise direction, as viewed in Fig. 9, to cooperate with the guide member 16" to deliver the cigars from the conveyor 16 to the conveyor 17, these conveyors 16 and 17 being identical with the conveyors 16 and 17 described above. Instead of delivering the cigars to another conveyor 18, the conveyor 17 delivers the cigars to a fixing means shown at the left of the chamber 15 and having the construction which is now to be described.

This fixing means includes a fixing drum 47 which is turnable on suitable parts of the support means 91 and which is driven from the motor 90 in any suitable way. The fixing drum 47 is in the form of a drum provided at its outer surface with a layer of highly absorbent foam rubber, in the same way as the coating drum 2. However, it will be noted that the fixing drum 47 is smaller than the drum 2. The drum 2 is preferably between 4 and 5 times as large as the drum 47. It is only necessary to engage the cigars for fixing purposes for a fraction of the time that they are engaged for being coated with the powder carrying solution, and for this reason the drum 47 need only be made a small fraction of the size of the coating drum 2. This arrangement is also in contrast to arrangements where the same machine is cleaned after providing the cigars with a powder coating and then used for providing the cigars with a fixing coating. Where such a construction is used the cigars are engaged for much too long a time and the best possible results cannot be obtained.

A holding member 48 similar to the holding member 3 cooperates with the drum 47 for holding the cigars against this drum, and it will be noted the cigars falling from the left end of the conveyor band 17 fall into the gap between the fixing drum 47 and the holding member 48. This holding member 48 is in the form of a bendable plate provided with a layer of foam rubber, as will be described below. Also it may be adjusted with respect to the drum 47 in a manner described below.

Located on the side of the fixing drum 47 opposite from the drying chamber 15 and closely adjacent to the fixing drum 47 is a container 49 similar to the container 8 and containing the fixing solution, this container 49 having projections fixed thereto and extending through suitable cutouts in the angle iron 53 fixed to the supporting frame 91 in the manner shown in Fig. 9, so that the container 49 is turnable about the angle iron 53. The container 49 is fixed to a block which receives a manually turnable screw member 54 which is turnable in a threaded bore of another block fixed to the support means, in the manner indicated at the left of Fig. 9, so that by turning element 54 it is possible to adjust the inclination of the container 49. Within the container 49 which is in all respects similar to the container 8 is located a pump which also is similar in all respects to the pump 34 described above. The only difference between the container 49 and the pump therein and the container 8 and the pump therein is one of size. The pump within the container 49 has a bottom inlet located very close to the bottom wall of the container 49 and the side walls of the container 49 are located very close to this pump so that it is impossible for any material to become deposited on the bottom wall of the container 49, and furthermore the discharge conduit 50 of the pump within the container 49 is provided with a valve which may be identical with the valve 36 for providing the desired recirculation of the fixing liquid so as to prevent stopping of the conduit 50. The pump within the container 49 is driven from the motor 90 and from the drive to the pump there is a drive to a pair of distributing rollers 51 and 52 carried by the container 49 in the same way that the distributing rollers 10 and 11 are carried by the container 8. Thus, by manipulating the adjusting member 54 it is possible to control the pressure of contact between the distributing roller 52 and the outer foam rubber covering of the fixing drum 47. Thus, with this arrangement a supply of fixing liquid is delivered to the fixing drum, and as the latter turns in a clockwise direction, as viewed in Fig. 9, the cigars which have been dried and which issue from the drying chamber 15 are automatically provided with a fixing coating which prevents the powder coating from becoming smeared.

The fixing solution located within the container 49 may have the following components:

|  | Kg. |
|---|---|
| Ethylcellulose | 3 |
| Softener | 1 |
| Ethanol | 96 |

Figures 10, 11, 12, 13, 14, 15:
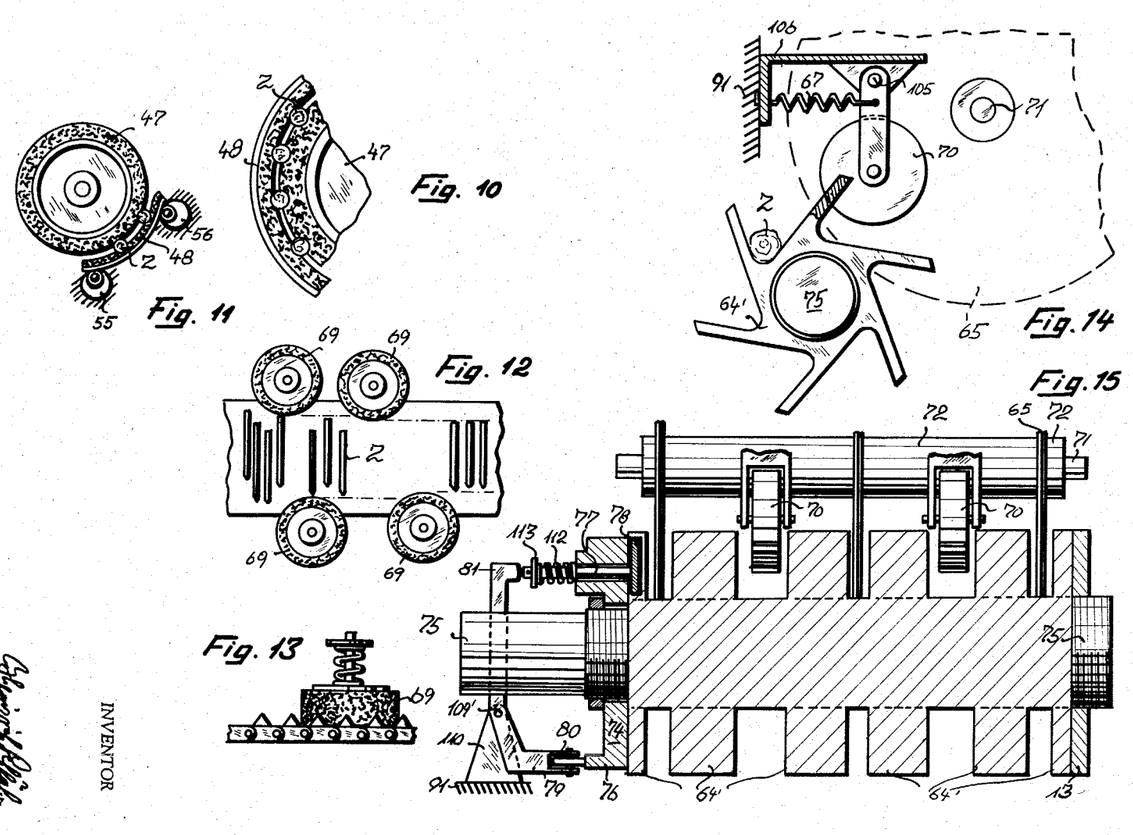
Fig. 10 is a fragmentary elevational view showing the cooperation between a fixing drum and a holding member for holding the cigars next to the fixing drum.
Fig. 11 is a fragmentary diagrammatic view of structure for adjusting the holding member of Fig. 10 with respect to the fixing drum.
Fig. 12 is a fragmentary, diagrammatic, plan view illustrating structure for aligning cigars on a conveyor band.
Fig. 13 is a fragmentary partly diagrammatic side elevational view showing how an aligning member of Fig. 12 is urged towards a conveyor band.
Fig. 14 is a partly diagrammatic, fragmentary, side elevational view of part of a cutting means according to the present invention for cutting cigars.
Fig. 15 is a partly diagrammatic elevational view showing the details of the cutting means of the present invention.

As may be seen from Fig. 10 the fixing drum 47 and the bendable member 48 are arranged so as to move the cigars Z between the foam rubber layers fixed to elements 47 and 48 in the manner indicated in Fig. 10. The bendable member 48 has a pair of apertured lugs fixed to its outer face adjacent each of its opposite ends, and a pair of rods extend through these lugs, the ends of these rods being visible in Fig. 11. These rods are fixed eccentrically to a pair of discs 55 and 56, respectively, and these discs are turnable in suitable openings of the support means 91. Thus, by turning the discs 55 and 56 it is possible to adjust the distance between the fixing drum 47 and the holding member 48 so as to accommodate cigars of different thickness. The discs 55 and 56 may be turned by hand, or any suitable crank and screw arrangement may be provided for this purpose.

Returning to Fig. 9, it will be seen that the cigars falling from the bottom end of the holding member 48, this bottom end being located opposite the lowest part of the drum 47, fall onto an additional conveyor band 57 which may be made up of pivotally connected links and cross strips of the type shown in Fig. 17, and which is carried by suitable pulleys indicated diagrammatically in Fig. 9, the left most of these pulleys being driven from the motor 90. A baffle 58 is located just over the left upper end of the conveyor band 57, as indicated in Fig. 9, to guarantee that cigars do not fall downwardly over this left upper end of the conveyor band 57 whose uppermost run moves to the right, as viewed in Fig. 9. As is evident from Fig. 9 the cigars which are received by the band 57 are carried thereby through the opening 95' back into the drying chamber 15, so that the same drying chamber is used both for drying the cigars after they are coated with the powder solution as well as drying the cigars after they are coated with the fixing solution. The drying chamber 15 and conduit 22 of Fig. 9 are provided with a passage 60 in the form of a tube passing through an opening in the right wall of the chamber 15 and completely through the conduit 22, this conduit 22 having free spaces before and behind the conduit 60, as viewed in Fig. 9, so that the conduit 22 provides communication between the fans 21 and 24 and thus the air withdrawn from the chamber 15 is partly delivered back to the heating chamber 19. However, the cigars carried by the band 57 are carried through the tubular member 60 beyond the drying chamber 15 to the exterior of the machine, and parts of the support means 91 in the form of a pair of walls located on opposite sides of the portion of band 57 which extends to the right beyond the drying chamber 15 carry a motor which drives fans 62—64, as indicated diagrammatically in Fig. 9, these fans being located beneath the right end portion of the topmost run of the conveyor band 57. The fans 62—64 are arranged to draw air downwardly through the top run of the band 57, so that in this way the cigars carried by the band 57 are cooled after they leave the drying chamber 15. It will be noted that the heating elements 20 in the heating chamber 19 heat the air delivered into the latter by the fan 24 and this air passes through the opening 59 into the chamber 15, suitable baffles being provided to direct this air upwardly and to the right, in the same way as in the embodiment of Fig. 1, and fresh air is drawn into the drying chamber 15 through the opening 95', so that in this way a thorough efficient drying action is provided and at the same time the temperature within the drying chamber never goes above 50° C. Thus, it will be seen that with the embodiment of Fig. 9 there is provided a coating means for coating the cigars with a powder solution, a drying means for drying the cigars, a fixing means for providing a fixing solution to the cigars, and a cooling means for cooling the cigars, as well as a conveyor means for conveying the cigars first to the coating means, then to the drying means, then to the fixing means, then again to the drying means, and finally to the cooling means.

After the dried cigars moved beyond the cooling means 62—64 at the right end of the conveyor band 57, they are received by a cutting means shown at the right of Fig. 9 for cutting the cigars to the desired lengths. This cutting means includes a celled drum 64 turnably carried by the support means 91 for rotation about its axis, and this celled drum cooperates with cutting discs 65 in the form of circular blades which cut the cigars to the desired lengths in the manner described below. Suction tubes 68 are associated with each cutting blade 65 and have inlet ends adjacent the celled drum 64 for sucking away the part of the cigars which are cut away therefrom, a suction fan 67 being provided within each suction tube 68 for drawing away the material sucked into the same. The blades 65 are turnable to the right away from the celled drum 64, in a manner described below, and in addition the blades are removable and exchangeable so that cigars of different lengths may be cut. After moving through the cutting means the cigars are delivered to a conveyor band 66 carried by suitable pulleys and having its top run moving to the right, as viewed in Fig. 9, for delivering the cigars to a location where the are further processed as by having suitable wrappers applied thereto or as by being packed, etc. The conveyor band 66 may have the same construction as the above described conveyor bands and the pulleys which support the conveyor band 66 are turnably supported by the support means 91, one of these pulleys being driven from the motor 90.

As is illustrated in Figs. 12 and 13, foam rubber discs 69 engage the top faces of the conveyor bands for aligning the cigars Z thereon. As may be seen from Fig. 12, as the conveyor band therein moves to the right it imparts turning movement to the foam rubber discs 69, and these in turn engage the top face of the conveyor band and the ends of the cigars Z to align the latter in the manner indicated at the right of Fig. 12. As may be seen from Fig. 13, each of the foam rubber aligning discs 69 is carried by the bottom face of a metallic disc from which a rod extends upwardly through a coil spring and through an opening in a suitable bracket fixed to the support means 91. Thus, these springs which are respectively associated with the discs 69 urge the latter downwardly and lightly against the conveyor bands so that the discs 69 turn as the conveyor bands advance and automatically align the cigars on the conveyor bands. Although only one bracket is shown in Fig. 13, it is to be understood that a pair of such brackets are provided spaced along the length of the rods so that the rods can only turn and the discs 69 can move up and down but are compelled to turn about a given axis. Discs 69 as shown in Fig. 12 are preferably located at the top run of the conveyor band 17 adjacent the left end thereof just before the cigars reach the fixing means shown at the lower left portion of Fig. 9, and these aligning discs 69 are also located on the top run of the band 57 adjacent the right end thereof, as viewed in Fig. 9, to align the cigars just before they are received by the cutting means.

The details of the cutting means are illustrated in Figs. 14 and 15. Thus, as is evident particularly from Fig. 15, the celled drum 64' which receives the cigars from the conveyor band 57 is provided with a plurality of annular slots axially spaced therealong, and holding rollers 70 as well as the cutting blades 65 extend into these slots, in the manner shown in Fig. 15. Each of the holding members 70 is turnable on a shaft carried by a bracket which is in turn pivotally connected at 105 to a bracket 106 fixed to the support means 91. A spring 107 is fixed to the support means and to each bracket which carries a roller 70 so as to urge the latter to the left, as viewed in Fig. 14. The shaft which carries the rollers 70 may be removed from the bracket carrying the same, so that in this way it is possible at any time to remove or change any of the rollers 70, for a purpose described below.

The circular cutting blades 65 are carried by a shaft 71 having thereon the spacer sleeves 72 which distribute the blades 65 along the shaft 71 at desired locations thereon so that the blades 65 will be accurately aligned with the annular slots of the celled drum 64'. The shaft 71 is provided with a suitable key engaging the blades 65 so that the latter are compelled to turn with the shaft 71 while being removable therefrom, and the two end spacer sleeves 72 may be in the form of nuts threadedly engaging the shaft 71 to fix the blades 65 on the shaft 71 in desired axial positions therealong.

As may be seen from Fig. 9, each end of the shaft 71 is carried by a pair of levers 108 and 109. The lever 108 is pivotally connected at its upper left end, as viewed in Fig. 9, to the support means 91, while the lever 109 is provided at its upper right end, as viewed in Fig. 9, with an elongated slot through which passes a bolt fixed to a lug extending from a portion of the support means 91, this bolt carrying a nut. Thus, by drawing the nut tightly on the bolt the lever 109 is fixed in a given position on the support means 91 to locate the cutting blades 65 in a given position. However, it is possible at any time to slide the levers 109 at opposite ends of the shaft 71 upwardly along the bolt passing through the slots thereof and to then tighten the nuts carried by these bolts so that in this way the blades 65 are turnable away from the celled drum 64' and may be fixed in a desired angular position with respect to the same.

As is evident from Fig. 14, as the celled drum 64' turns in a clockwise direction, in which it is turned by a drive from the motor 90, the cigars Z come into engagement with the holding rollers 70 as well as with the cutting blades 65, and these cutting blades cut the cigars to the desired length, the holding rollers 70 holding the cigars in the compartments of the celled drum 64' while they are cut so that the best possible cutting action is provided.

With the arrangement which is shown in Fig. 15 a cigar which is slightly more than twice the length of two cigars is simultaneously cut by the three blades 65 as illustrated in Fig. 15 into a pair of cigars of the desired length. This arrangement is used when relatively short cigars are to be manufactured. If desired, it is possible to eliminate one of the members 70 and one of the end blades 65 and to treat only cigars which are slightly longer than their final length, cutting these cigars with the pair of blades 65 which remain, and also it is possible to provide extremely long cigars by eliminating the intermediate cutting blade 65 and cutting such long cigars with the two outermost blades 65, sleeves 72 of desired length being provided when such changes are made in order to locate the cutting blades 65 in the desired positions along the shaft 71, this shaft being driven from the motor 90 through a suitable transmission such as a belt and pulley, for example.

The celled drum 64' is carried by an elongated shaft 75 for rotation therewith, this shaft being connected to the drum 64' by a suitable key or the like, and the shaft 75 is driven in a suitable manner from the motor 90. At its right end, as viewed in Fig. 15, the cells which extend axially along the drum 64' are closed by a plate 73 fixed to the shaft 75 in the position shown in Fig. 15. At its left end, these cells of the drum 64' are closed by a plate 74 also fixed to the shaft 75 for rotation therewith, and the plate 74 is provided at its outer left face, as viewed in Fig. 15, adjacent its periphery with a cam 76 made up of a plurality of preferably pyramidal camming projections.

The camming projections of the cam 76 at the left face of the disc 74 which is fixed to the shaft 75 engage the follower roller 80 which is turnably carried by the bottom end of a lever 79 which is pivotally carried intermediate its ends at 109' by a lug 110 of the support means 91. The top end of the lever 79 has a hammer 81 fixed thereto, and if desired the connection between the hammer 81 and the lever 79 may be resilient. Thus, a suitable fairly heavy leaf spring may be provided, if desired, to connect the hammer 81 to the lever 79, although this hammer 81 may be rigidly fixed to the lever 79 in the manner indicated in Fig. 15 where the hammer 81 is shown as being integral with the lever 79. The hammer 81 engages the left free end of one of a plurality of rods 77 in the manner shown in Fig. 15, each of these rods 77 extending respectively through an aperture of the disc 74 into a cell of the celled drum 64'. There are as many rods 77 as there are cells and these rods 77 are respectively aligned with the cells and carry at their right ends, as viewed in Fig. 15, relatively soft pusher members 78 which may be made of soft rubber or the like. These pusher members 78 are respectively located in the cells of the celled drum 64' and have the same cross section of these cells so that the pusher members 78 are freely shiftable axially along the cells at their left ends, as viewed in Fig. 15. The rods 77 respectively carry coil springs 112 engaging the disc 74 as well as washers 113 which engage the left ends of the coil springs 112, respectively, so that these coil springs 112 urge the rods 77 outwardly to the position shown in Fig. 15 where the pusher members 78 respectively fixed to the rods 77 are located at the left ends of the cells of the celled drum 64', in the manner shown in Fig. 15. The soft rubber cushion members 78 may be fixed to the right faces of metallic plates which are in turn fixed as by soldering, welding, or the like, to the right ends of the rods 77, respectively.

With this arrangement, as the shaft 75 is driven and the celled drum 64' turns in a clockwise direction, as viewed in Fig. 14, the camming portions of the cam 76 successively engage the follower roller 80 to turn the lever 79 momentarily in a clockwise direction about the pivot 109', as viewed in Fig. 15. The camming projections of the cam 76 are so located that the rods 77 and pusher members 78 therewith are shifted to the right, as viewed in Fig. 15, just before the cigars in the cells reach the rollers 70 and cutting blades 65, and in this way the cigars are shifted so that their right ends, as viewed in Fig. 15, engage the disc 73, and in this way the cigars are accurately positioned in the drum 64' just before these cigars are cut, and thus a very accurate cutting of the cigars is assured.

Figure 16:
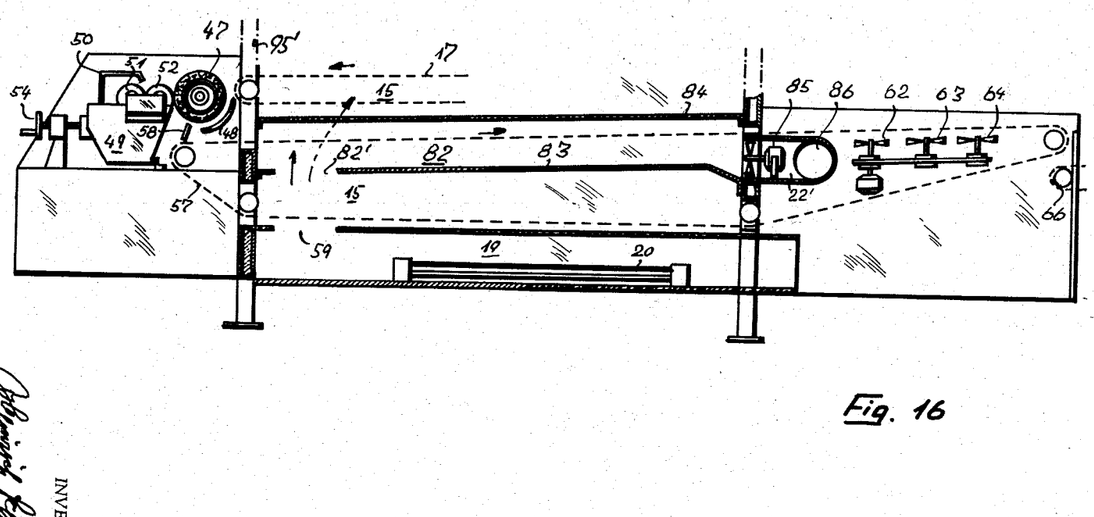
Fig. 16 is a sectional side elevational partly diagrammatic view of still another embodiment of a cigar treating apparatus according to the present invention.

The above described fixing solution applied to the cigars with the embodiment of Fig. 9 is not particularly harmful to the operator and is not likely to cause any fire or explosion, and this fixing solution may be freely used with the embodiment of Fig. 9. However, there are circumstances where it is desired to use a fixing solution which may be harmful to the operator and which may be likely to cause fire or explosion, and where such a fixing solution is used the embodiment of Fig. 9 may be modified as indicated in Fig. 16. Such a harmful fixing solution may have the following components:

| | Kilograms |
|---|---|
| Ethylcellulose | 3 |
| Softener | 1 |
| Methanol | 50 |
| Isopropanol | 46 |

This solution is harmful because it includes isopropanol.

As may be seen from Fig. 16, the structure is identical with that of Fig. 9 except that a separate drying chamber 82 is provided in the interior of the drying chamber 15. This drying chamber 82 is in the form of an elongated conduit narrower than the chamber 15 and extending from the right to the left end walls thereof, as viewed in Fig. 16. The chamber 82 is provided with a top wall 84 and with a bottom wall 83, and the bottom wall 83 is provided with an opening 82' adjacent its left end, as viewed in Fig. 16, so that the hot air which passes through the opening 59 of the heating chamber 19 into the chamber 15 may pass upwardly through the opening 82' into the chamber 82. The remainder of the hot air entering the chamber 15 passes before and behind the chamber 82 upwardly along the interior of the drying chamber 15 to dry the cigars in the manner described above.

The chamber 82 is provided at its left end with an opening communicating with the opening 95' of the chamber 15 and into which the top run of the conveyor band 57' of the embodiment of Fig. 16 passes. It will be noted that with this embodiment the conveyor band 57' extends through the drying chamber 15 with its bottom run just above the heating chamber 19, the front and rear walls of the chamber 15 being provided with suitable openings to allow the conveyor band 57' to pass therethrough in the manner indicated in Fig. 16. At its right end, the chamber 15 also is provided with an additional opening which communicates with the chamber 82, and in this opening is located a conduit 86 which communicates with the interior of the chamber 82. The same fans 21 and 24 are provided with the embodiment of Fig. 16 as with the embodiment of Fig. 9 for providing the described circulation of the air, these fans being omitted from Fig. 16 for the sake of simplicity. Within the conduit 86 adjacent the right end of the chamber 82 is located an additional suction fan 85 for drawing the air in the chamber 82 into the conduit 86, and the latter may direct this harmful gas to any desired location. The upper run of the band 57' passes through the space over the conduit 86 in the opening of the chamber 15 which accommodates the conduit 86, and the right end portion of the upper run of the band 57' cooperates with a cooling means 62—64 identical with that shown in Fig. 9 for cooling the cigars after they move beyond the chamber. A conveyor band 66 is provided with the embodiment of Fig. 16 in the same way as that of Fig. 9 to receive the cigars after they have been cut by the same cutting means which was described above.

It should be noted that the embodiment of Fig. 16 includes a conduit 22' identical with the conduit of Fig. 9 except that the tube 86 passes through this conduit 22' and the top run of the band 57' as well as its bottom run also passes through suitable openings provided in the conduit 22'. Thus, with the arrangement of Fig. 16 the same results as that of Fig. 9 are provided, but at the same time it is possible to dry the fixing solution even though it is relatively harmful without any danger of allowing the gas from the volatile fixing solution to reach the outer atmosphere. The fan 85 in addition to drawing hot air into the interior of the chamber 82 through the opening 82' draws fresh air into the same through the lower part of the opening 95' which communicates with the interior of the chamber 82.

It is apparent that the above described structure of the invention it is possible to treat the cigars during the finishing steps of their treatment in the best possible way and in a fully continuous manner since the cigars never stop moving during the entire time that they pass through the apparatus, even when the conveyor means moves the cigars from the cooling means to the cutting means.

It will be understood that each of the elements described above, or two or more together, may also find a useful application in other types of cigar treating apparatus differing from the types described above.

While the invention has been illustrated and described as embodied in apparatus for finish treating cigars, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a cigar treating machine, in combination, support means; a coating drum turnably carried by said support means for coating cigars with a given solution; a container for holding the solution carried by said support means directly next to said drum, said container having a bottom wall and side walls extending upwardly from said bottom wall; distributor roller means engaging said drum for distributing thereto the solution to be applied to the cigars; and pump means in said container for pumping the solution therein onto said distributing roller means, said pump means having an inlet located closely adjacent to said bottom wall of said container and said side walls of said container being located closely adjacent to said pump means so that there is no possibility of forming a deposit from the solution in the container on the bottom wall thereof.

2. In a cigar treating machine, in combination, support means; a coating drum turnably carried by said support means for applying a given solution to the treated cigars; distributing roller means engaging said drum for distributing said solution thereto; a container carried by said support means for holding the solution; pump means in said container for pumping the solution therein onto said distributing roller means, said pump means including an elongated conduit; and adjusatble valve means carried by and communicating with the interior of said conduit for returning a part of the liquid flowing therethrough back into the interior of said container.

3. In a cigar treating apparatus, in combination, support means; a coating drum turnably carried by said support means for applying a coating of a given solution to cigars; a bendable sheet extending part way around said drum and ending below the lowest portion thereof, said sheet being spaced from and substantially coaxial therewith for holding cigars against said drum; and a pair of independent adjusting means operatively connected to said sheet adjacent the ends thereof, respectively, for adjusting the distance between said sheet and said drum.

4. In a cigar treating apparatus, in combination, support means; a coating drum turnably carried by said support means for applying a coating of a given solution to cigars; a bendable sheet extending part way around said drum and ending below the lowest portion thereof, said sheet being spaced from and substantially coaxial therewith for holding cigars against said drum; and a pair of independent adjusting means operatively connected to said sheet adjacent the ends thereof, respectively, for adjusting the distance between said sheet and said drum, said pair of adjusting means respectively comprising a pair of levers respectively connected pivotally to said ends of said sheet and respectively being carried for independent turning movement by said support means.

5. In a cigar treating apparatus, in combination, support means; a coating drum turnably carried by said support means for applying a coating of a given solution to cigars; a bendable sheet extending part way around said drum and ending below the lowest portion thereof, said sheet being spaced from and substantially coaxial therewith for holding cigars against said drum; and a pair of independent adjusting means operatively connected to said sheet adjacent the ends thereof, respectively, for adjusting the distance between said sheet and said drum, said pair of adjusting means respectively comprising a pair of levers respectively connected pivotally to said ends of said sheet and respectively being carried for independent turning movement by said support means respectively about axes which have a position capable of giving to said levers a turning movement which maintains said sheet coaxial with said drum irrespective of the distance between the latter and said sheet.

6. In a cigar treating apparatus, in combination, support means; a coating drum turnably carried by said support means for applying to cigars a coating of a given solution; a drying chamber carried by said support means; conveyor means for conveying cigars from said drum along the interior of said drying chamber; a heating chamber for heating air communicating with said drying chamber; air moving means communicating with said drying chamber for drawing into the latter fresh air and air from said drying chamber and for discharging air from said drying chamber; and means for discharging to the atmosphere only a fraction of the air discharged from said drying chamber by said air moving means.

7. In a cigar treating machine, in combination, support means; a coating drum turnably carried by said support means for coating cigars with a given solution; a drying chamber having an open end adjacent said drum and an opposite end distant from said open end; a heating chamber for heating air having one end portion communicating with said drying chamber adjacent said open end thereof and having an opposite end adjacent said opposite end of said drying chamber; conveyor means for conveying cigars from said drum along the interior of said drying chamber; conduit means providing communication between said opposite ends of said chambers; first air moving means located at said opposite end of said drying chamber and communicating with said conduit means for drawing air from said drying chamber into said conduit means so as to draw air from said heating chamber into said drying chamber and so as to draw fresh air through said open end of said drying chamber into the latter; second air moving means located at said opposite end of said heating chamber and communicating with said conduit means for moving air from the latter into said heating chamber; and adjustable valve means carried by said conduit means for discharging from the latter to the outer atmosphere a given fraction of the air withdrawn from said drying chamber by said first moving means.

8. In a cigar treating machine, in combination, support means; a coating drum turnably carried by said support means for coating cigars with a given solution; a drying chamber having an open end adjacent said drum and an opposite end distant from said open end; a heating chamber for heating air having one end portion communicating with said drying chamber adjacent said open end thereof and having an opposite end adjacent said opposite end of said drying chamber; conveyor means for conveying cigars from said drum along the interior of said drying chamber; conduit means providing communication between said opposite ends of said chambers; first air moving means located at said opposite end of said drying chamber and communicating with said conduit means for drawing air from said drying chamber into said conduit means so as to draw air from said heating chamber into said drying chamber and so as to draw fresh air through said open end of said drying chamber into the latter; second air moving means located at said opposite end of said heating chamber and communicating with said conduit means for moving air from the latter into said heating chamber, said first moving means having an output greater than said second moving means for creating a partial vacuum in said drying chamber for drawing fresh air into the latter through said open end thereof; and adjustable valve means carried by said conduit means for discharging from the latter to the outer atmosphere a given fraction of the air withdrawn from said drying chamber by said first moving means.

9. In a cigar treating machine, in combination, support means; a coating drum turnably carried by said support means for coating cigars with a given solution; a drying chamber having an open end adjacent said drum and an opposite end distant from said open end; a heating chamber for heating air having one end portion communicating with said drying chamber adjacent said open end thereof and having an opposite end adjacent said opposite end of said drying chamber; conveyor means for conveying cigars from said drum along the interior of said drying chamber; conduit means providing communication between said opposite ends of said chambers; first air moving means located at said opposite end of said drying chamber and communicating with said conduit means for drawing air from said drying chamber into said conduit means so as to draw air from said heating chamber into said drying chamber and so as to draw fresh air through said open end of said drying chamber into the latter; second air moving means located at said opposite end of said heating chamber and communicating with said conduit means for moving air from the latter into said heating chamber; adjustable valve means carried by said conduit means for discharging from the latter to the outer atmosphere a given fraction of the air withdrawn from said drying chamber by said first moving means; and baffle means in said drying chamber for directing air from said heating chamber upwardly from a lower portion of said drying chamber toward said first moving means.

10. In a cigar treating machine, in combination, support means; a coating drum turnably carried by said support means for applying to cigars a coating of a given solution; a drying chamber having an open end adjacent said drum; a pair of elongated conveyor bands located one above the other in said drying chamber for conveying cigars from said drum first in one direction along the interior of said drying chamber in an opposite direction along the interior of said drying chamber; air moving means communicating with the interior of said drying chamber for drawing air into the latter through said open end thereof; and baffle means located at said open end of said drying chamber for directing the air entering the same into the space between said conveyor bands.

11. In a cigar treating apparatus, in combination, support means; a coating drum turnably carried by said support means for coating cigars with a given solution; a drying chamber having an open end adjacent said coating drum; conveyor means extending from said open end of said drying chamber along the interior thereof for conveying cigars from said coating drum along the interior of said drying chamber; and baffle means in said drying chamber over said conveyor means for directing air moving toward the top of said drying chamber back down to said conveyor means and for providing a turbulence in the air.

12. In a cigar treating apparatus, in combination, support means; a coating drum turnably carried by said support means for coating cigars with a given solution; a drying chamber having an open end adjacent said coating drum; conveyor means extending from said open end of said drying chamber along the interior thereof for conveying cigars from said coating drum along the interior of said drying chamber; heating chamber communicating with said drying chamber; heating means in said heating chamber for heating air which moves from said heating chamber to said drying chamber; and thermostat means in said drying chamber operatively connected to said heating means for operating the latter to maintain the air in said drying chamber at a temperature below 50° C.

13. In a cigar treating machine, in combination, coating means for coating cigars with a given solution; fixing means for fixing the solution on the cigars; drying means for drying the cigars; cutting means for cutting the cigars; and conveyor means for conveying the cigars first to the coating means, then to the drying means, then to the fixing means, then again to the drying means, and finally to the cutting means.

14. In a cigar treating apparatus, in combination, coating means for coating the cigars with a given solution; fixing means for fixing the solution on the cigars; drying means for drying the cigars; cooling means for cooling the cigars; cutting means for cutting the cigars; and conveyor means for conveying the cigars firsts to the coating means, then to the drying means, then to the fixing means, then again to the drying means, then to the cooling means, and finally to the cutting means.

15. In a cigar treating machine, in combination, coating means for coating the cigars with a given solution; a drying chamber having an open end adjacent said coating means; conveyor means for conveying the cigars from the coating means through the open end of said drying chamber into the latter and then back to said open end of said chamber; and fixing means located adjacent said open end of said chamber for receiving the dried cigars therefrom for fixing the solution on said cigars, said fixing means including a turnable fixing drum for applying to the cigars a fixing solution, a distributor roller engaging said fixing drum, a container for holding fixing solution located closely adjacent to said distributing roller and fixing drum, and a pump for pumping the solution from the container to the distributor roller.

16. In a cigar treating machine, in combination, coating means for coating the cigars with a given solution; a drying chamber having an open end adjacent said coating means; conveyor means for conveying the cigars from the coating means through the open end of said drying chamber into the latter and then back to said open end of said chamber; and fixing means located adjacent said open end of said chamber for receiving the dried cigars therefrom for fixing the solution on said cigars, said fixing means including a turnable fixing drum for applying to the cigars a fixing solution, a distributor roller engaging said fixing drum, a container for holding fixing solution located closely adjacent to said distributing roller and fixing drum, and a pump for pumping the solution from the container to the distributor roller, said container being located on the side of said fixing drum opposite from said drying chamber.

17. In a cigar treating machine, in combination, coating means for coating the cigars with a given solution; a drying chamber having an open end adjacent said coating means; conveyor means for conveying the cigars from the coating means through the open end of said drying chamber into the latter and then back to said open end of said chamber; and fixing means located adjacent said open end of said chamber for receiving the dried cigars therefrom for fixing the solution on said cigars, said fixing means including a turnable fixing drum for applying to the cigars a fixing solution, a distributor roller engaging said fixing drum, a container for holding fixing solution located closely adjacent to said distributing roller and fixing drum, and a pump for pumping the solution from the container to the distributor roller, said coating means including a coating drum which is between four and five times as large as said fixing drum.

18. In a cigar treating machine, in combination, coating means for coating the cigars with a given solution; a drying chamber having an open end adjacent said coating means; conveyor means for conveying the cigars from the coating means through the open end of said drying chamber into the latter and then back to said open end of said chamber; fixing means located adjacent said open end of said chamber for receiving the dried cigars therefrom for fixing the solution on said cigars; a conveyor band extending from said fixing means through and beyond said drying chamber for conveying cigars from said fixing means through and beyond said drying chamber; and cooling means located adjacent a portion of said conveyor band located beyond said drying chamber for drawing cooling air downwardly onto the cigars on said conveyor band after they leave said drying chamber.

19. In a cigar treating machine, in combination, coating means for coating the cigars with a given solution; a drying chamber having an open end adjacent said coating means; conveyor means for conveying the cigars from the coating means through the open end of said drying chamber into the latter and then back to said open end of said chamber; fixing means located adjacent said open end of said chamber for receiving the dried cigars therefrom for fixing the solution on said cigars; a second drying chamber; a conveyor band extending from said fixing means through said second drying chamber for conveying cigars from said fixing means along the interior of said second drying chamber; a conduit communicating with said second drying chamber for carrying the gas therein out of the same; and air moving means for drawing air through said second drying chamber into said conduit.

20. In a cigar treating apparatus, in combination, support means; coating means carried by said support means for coating cigars with a given solution; fixing means carried by said support means for fixing the solution on the cigars; a drying chamber carried by said support means; a heating chamber for heating air communicating with said drying chamber; air moving means communicating with said drying chamber for drawing into the latter fresh air and air from said heating chamber and for discharging air from said drying chamber; means for discharging to the atmosphere a fraction of the air discharged from the drying chamber by said air moving means; and conveyor means for conveying the cigars first to the coating means, then from the coating means through the drying chamber to said fixing means, and then back to the drying chamber.

21. A cigar treating apparatus as defined in claim 20 and including cooling means for cooling the cigars and wherein said conveyor means convey the cigars after the same have been carried back to the drying means from the drying means to the cooling means.

22. In a cigar treating apparatus, in combination, support means; a coating drum turnably carried by said support means for applying a coating to cigars; a first bendable sheet extending partly around said coating drum and being spaced from and substantially coaxial therewith for holding cigars against said drum; first distributing roller means engaging said coating drum for distributing on the latter a solution to be coated onto the cigars; a first container for holding the solution; first pump means for pumping the solution from the container to the distributing roller means, said first container and first pump means being located directly next to said coating drum; a fixing drum turnably carried by said support means for applying to the cigars a fixing solution for fixing the coating on the cigars; a second bendable sheet extending partly around said fixing drum and being spaced from and substantially coaxial therewith for holding cigars against said fixing drum; second distributing roller means engaging said fixing drum; a second container for holding the fixing solution located closely adjacent to said fixing drum; second pump means for pumping the solution from said second container to said second distributor roller means; a drying chamber carried by said support means; a heating chamber for heating air communicating with said drying chamber; air moving means communicating with said drying chamber for drawing into the latter fresh air and air from said heating chamber and for discharging air from said drying chamber;

means for discharging to the atmosphere a fraction of the air discharged from the drying chamber by said air moving means; and conveyor means for conveying the cigars first to the coating drum, then from the coating drum through the drying chamber to said fixing drum, and then from said fixing drum through said drying chamber.

23. A cigar treating apparatus as defined in claim 22 in which said first bendable sheet extending partly around said coating drum is considerably longer than said second bendable sheet extending partly around said fixing drum.

24. A cigar treating apparatus as defined in claim 22 in which said second container being located on the side of said fixing drum opposite from said drying chamber.

25. A cigar treating apparatus as defined in claim 22 in which said conveying means extend beyond said drying chamber for conveying cigars from said fixing drum through and beyond said drying chamber; and including cooling means located adjacent a portion of said conveyor means located beyond said drying chamber for drawing cooling air downwardly onto the cigars after they leave said drying chamber.

26. A cigar treating apparatus as defined in claim 22 in which said first pump means having an inlet located closely adjacent to the bottom wall of said first container and in which the side walls of said first container being located closely adjacent to said first pump means so that there is no possibility of forming a deposit from the solution in said first container on the bottom wall thereof.

27. A cigar treating apparatus as defined in claim 26 in which said pump means include an elongated conduit; and including adjustable valve means carried by and communicating with the interior of said conduit for returning a part of the liquid flowing therethrough back into the interior of said container.

28. A cigar treating apparatus as defined in claim 22 and including a pair of independent adjusting means operatively connected to said first bendable sheet adjacent the ends thereof for adjusting the distance between said sheet and said coating drum.

29. A cigar treating apparatus as defined in claim 22 in which said drying chamber has an open end adjacent said coating drum and an opposite end distant from said open end, and in which said heating chamber has one end portion communicating with said drying chamber adjacent said open end thereof and an opposite end adjacent said opposite end of said drying chamber; said apparatus including conduit means providing communication between said opposite ends of said chambers and said air moving means comprising first air moving means located at said opposite end of said drying chamber and communicating with said conduit means for drawing air from said drying chamber into said conduit means so as to draw air from said heating chamber into said drying chamber and so as to draw fresh air through said open end of said drying chamber into the latter, and second air moving means located at said opposite end of said heating chamber and communicating with said conduit means for moving air from the latter into said heating chamber; and said apparatus including further adjustable valve means carried by said conduit means for discharging from the latter to the outer atmosphere a given fraction of the air withdrawn from the drying chamber by said first air moving means.

30. A cigar treating apparatus as defined in claim 29 in which said first air moving means having an output greater than said second air moving means for creating a partial vacuum in said drying chamber for drawing fresh air into the latter through said open end thereof.

31. A cigar treating apparatus as defined in claim 29 and including baffle means in said drying chamber for directing air from said heating chamber upwardly from a lower portion of said drying chamber toward said first air moving means.

32. A cigar treating apparatus as defined in claim 29 and including baffle means in said drying chamber over said conveyor means for directing air moving toward the top of the drying chamber back down to said conveyor means and for providing turbulence in the air.

33. A cigar treating apparatus as defined in claim 30 and including thermostat means in said drying chamber operatively connected to said heating means for operating the latter to maintain the air in said drying chamber at a temperature below 50° C.

References Cited in the file of this patent

UNITED STATES PATENTS

| | | |
|---|---|---|
| 249,029 | DuBrul | Nov. 1, 1881 |
| 255,921 | Bowman et al. | Apr. 4, 1882 |
| 256,065 | Spindler | Apr. 4, 1882 |
| 1,480,790 | Stanley | Jan. 15, 1924 |
| 1,746,645 | Fox | Feb. 11, 1930 |
| 1,837,682 | Searight | Dec. 22, 1931 |
| 1,847,769 | Krucken | Mar. 1, 1932 |
| 1,948,626 | Patterson et al. | Feb. 27, 1934 |
| 2,754,797 | Krucken | July 17, 1956 |